(12) United States Patent
Ito et al.

(10) Patent No.: US 9,982,860 B2
(45) Date of Patent: May 29, 2018

(54) VEHICULAR LAMP

(71) Applicant: KOITO MANUFACTURING CO., LTD., Tokyo (JP)

(72) Inventors: Toru Ito, Shizuoka (JP); Yoshiro Ito, Shizuoka (JP); Masaya Shido, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 1 day.

(21) Appl. No.: 14/837,675

(22) Filed: Aug. 27, 2015

(65) Prior Publication Data
US 2016/0061397 A1 Mar. 3, 2016

(30) Foreign Application Priority Data

Aug. 29, 2014 (JP) ................. 2014-175590

(51) Int. Cl.
| | |
|---|---|
| *F21V 5/00* | (2018.01) |
| *F21S 8/10* | (2006.01) |
| *B60Q 1/00* | (2006.01) |
| *B60Q 1/30* | (2006.01) |

(52) U.S. Cl.
CPC ........ *F21S 48/1163* (2013.01); *B60Q 1/0041* (2013.01); *B60Q 1/30* (2013.01); *F21S 48/211* (2013.01); *F21S 48/217* (2013.01)

(58) Field of Classification Search
CPC ............... F21S 48/1163; F21S 48/1154; F21S 48/1159; F21S 48/1233; F21S 48/211; F21S 48/217; B60Q 1/0041; B60Q 1/30

USPC .................... 362/520, 496, 498, 518; 257/99
See application file for complete search history.

(56) References Cited

U.S. PATENT DOCUMENTS

| | | | | |
|---|---|---|---|---|
| 2001/0053082 | A1* | 12/2001 | Chipalkatti | B60Q 1/26 362/496 |
| 2002/0145882 | A1* | 10/2002 | Shimakura | B29C 45/2673 362/518 |
| 2003/0147253 | A1* | 8/2003 | Shy | B60Q 1/2665 362/545 |
| 2005/0140278 | A1* | 6/2005 | Kato | H01L 25/048 313/504 |
| 2010/0065832 | A1* | 3/2010 | Sugimoto | H01L 27/3293 257/40 |
| 2011/0222304 | A1* | 9/2011 | Tatsukawa | F21S 48/1159 362/518 |

(Continued)

FOREIGN PATENT DOCUMENTS

| | | |
|---|---|---|
| JP | 2013-45523 A | 3/2013 |
| JP | 2013-229202 A | 11/2013 |

*Primary Examiner* — Anh Mai
*Assistant Examiner* — Glenn Zimmerman
(74) *Attorney, Agent, or Firm* — Sughrue Mion, PLLC

(57) ABSTRACT

A vehicular lamp includes a lamp body, a translucent outer cover, and a planar light source including a substrate and an organic EL light emitting layer formed on one side surface of the substrate. The planar light source has a bent portion in which the substrate having flexibility is bent at a predetermined position in a portion formed with the organic EL light emitting layer such that one end portion of the substrate is directed to one of a side of the outer cover and a side opposite to the outer cover, or the planar light source is provided such that at least part of an outer peripheral end of the organic EL light emitting layer emits light.

9 Claims, 10 Drawing Sheets

(56) References Cited

U.S. PATENT DOCUMENTS

| | | | |
|---|---|---|---|
| 2012/0018770 A1* | 1/2012 | Lu | H01L 51/5225 257/99 |
| 2013/0039087 A1* | 2/2013 | Gasquet | F21S 48/1163 362/521 |
| 2013/0049570 A1* | 2/2013 | Natsume | B60Q 1/0041 313/498 |
| 2013/0329445 A1* | 12/2013 | Oh | B60Q 1/0041 362/543 |
| 2014/0286034 A1* | 9/2014 | Yamada | F21S 48/217 362/518 |
| 2015/0023046 A1* | 1/2015 | Shido | H01L 25/048 362/543 |
| 2016/0153637 A1* | 6/2016 | Tsukamoto | B60Q 1/44 362/540 |

* cited by examiner

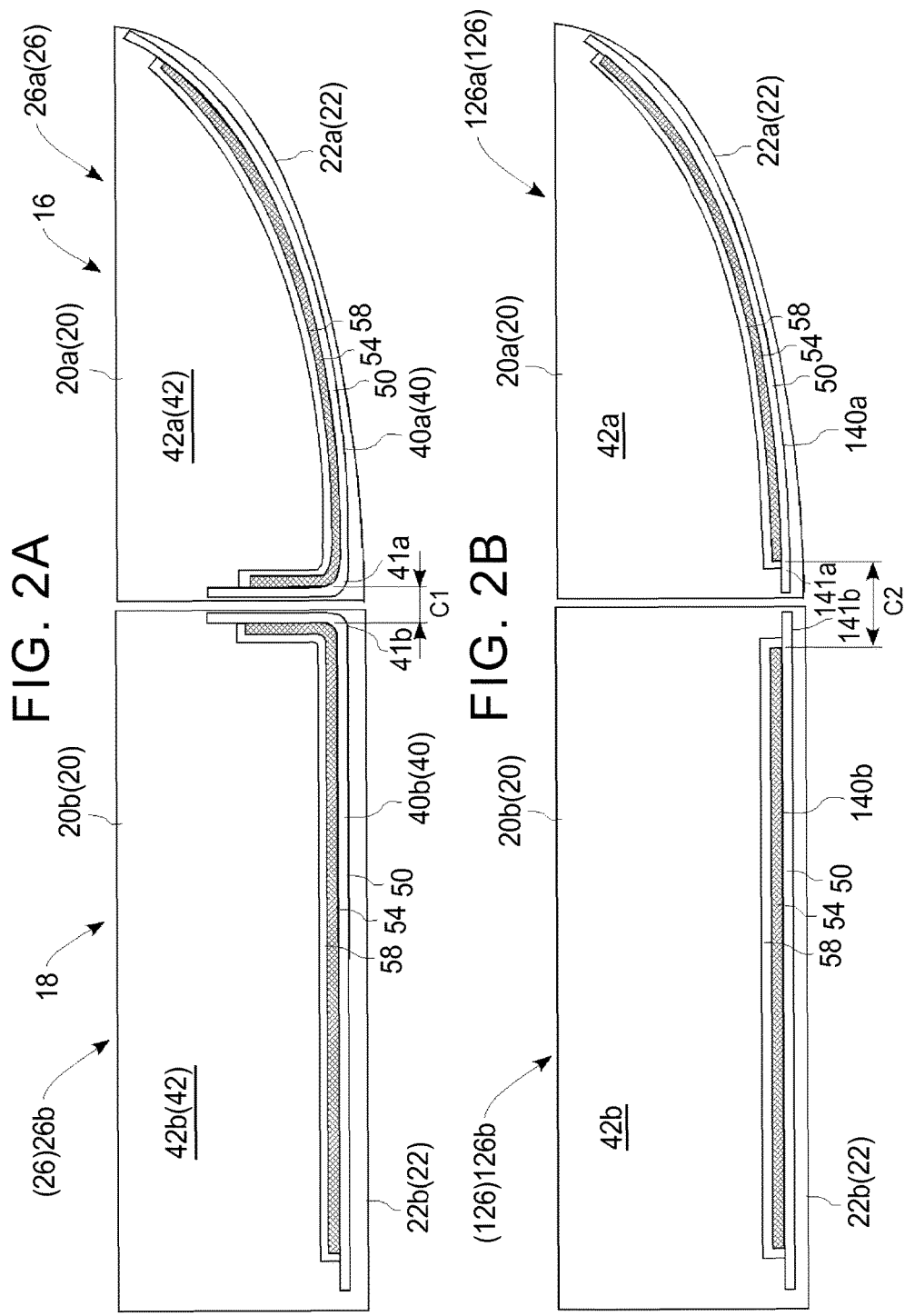

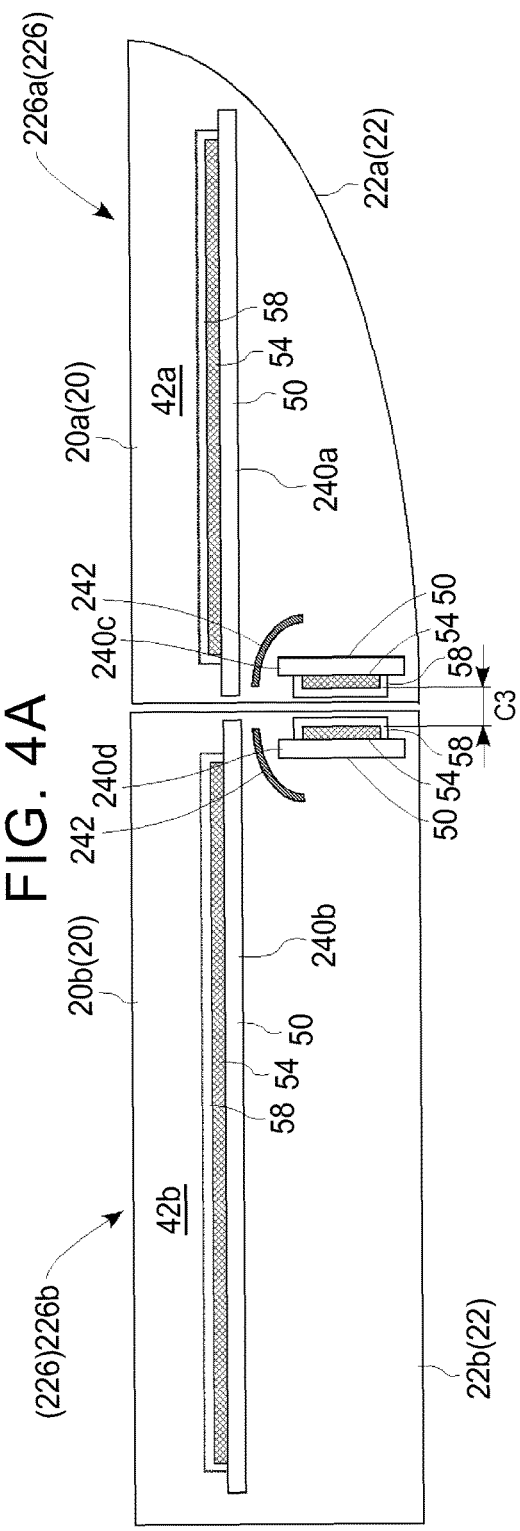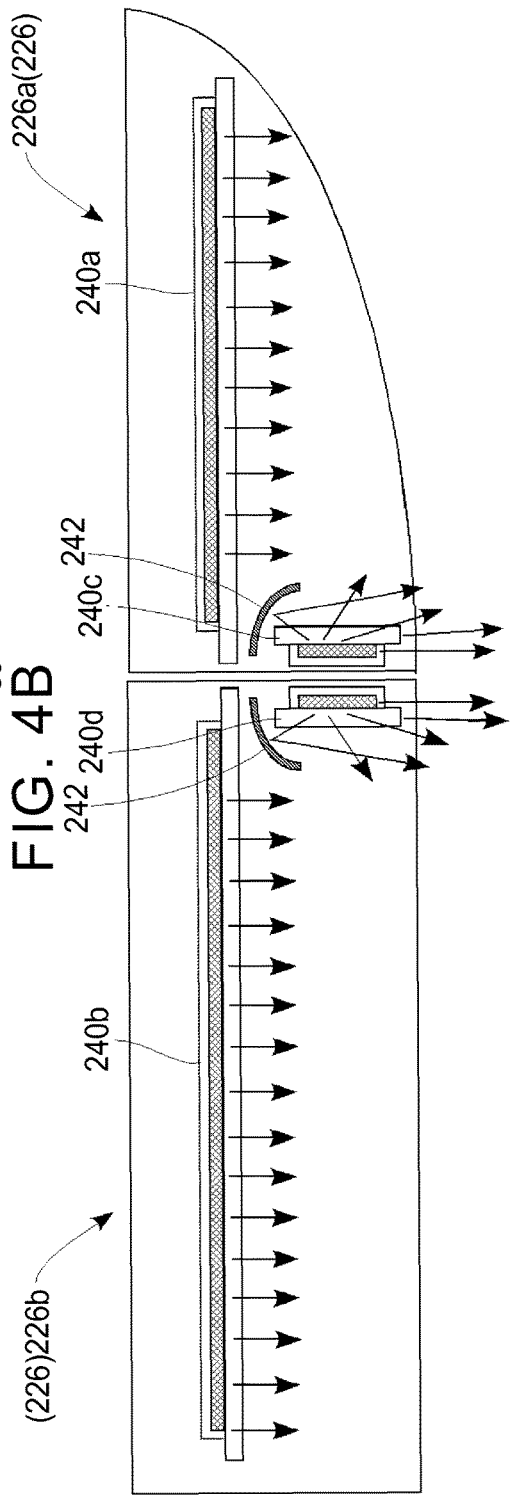

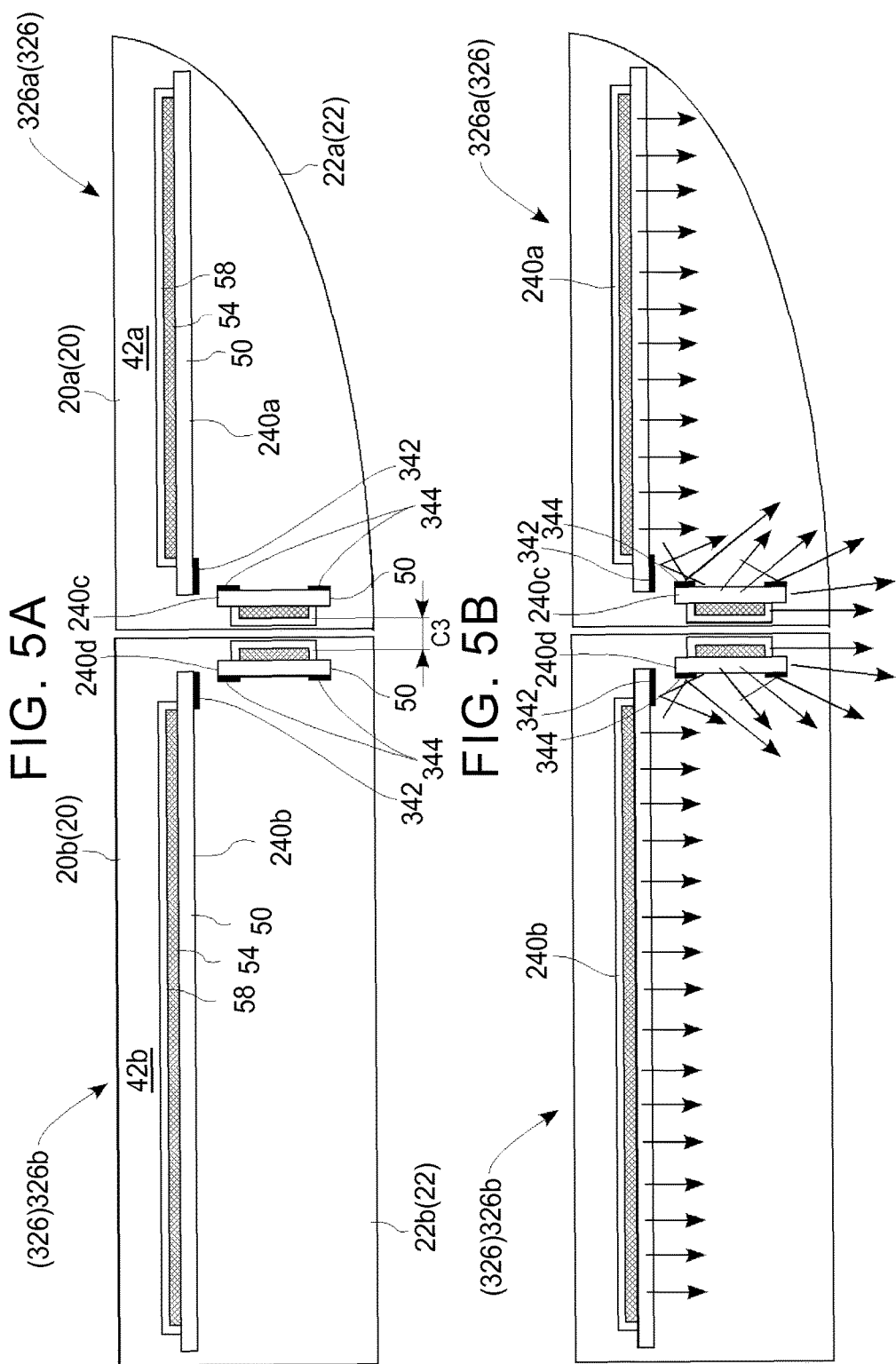

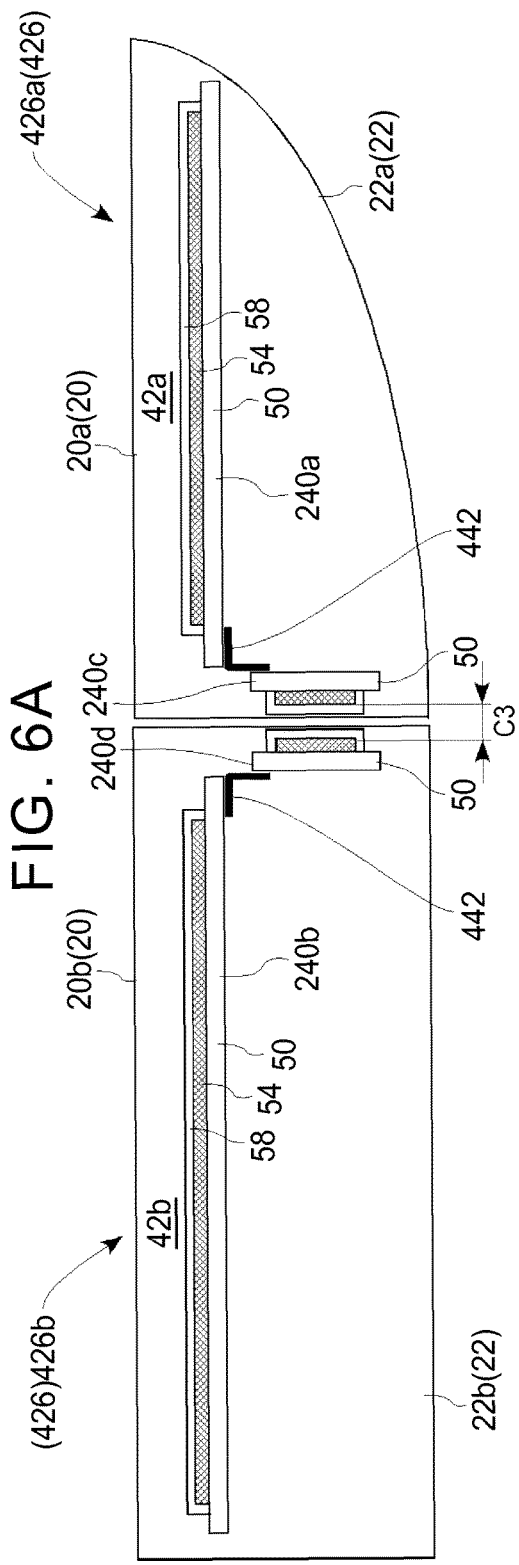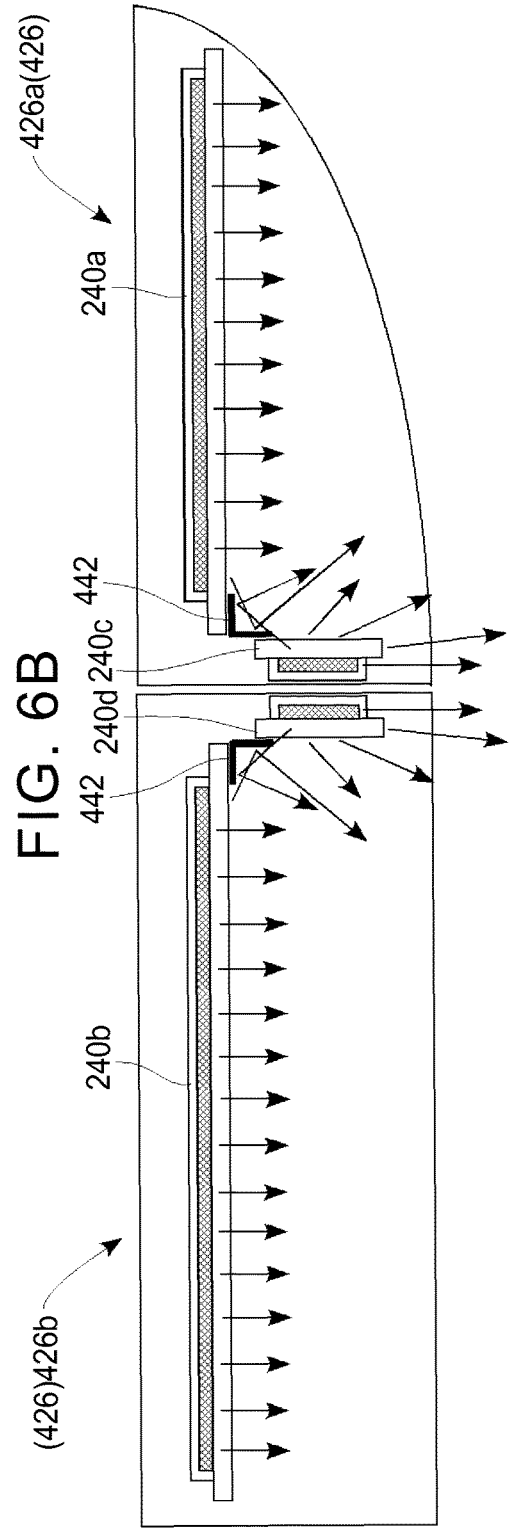

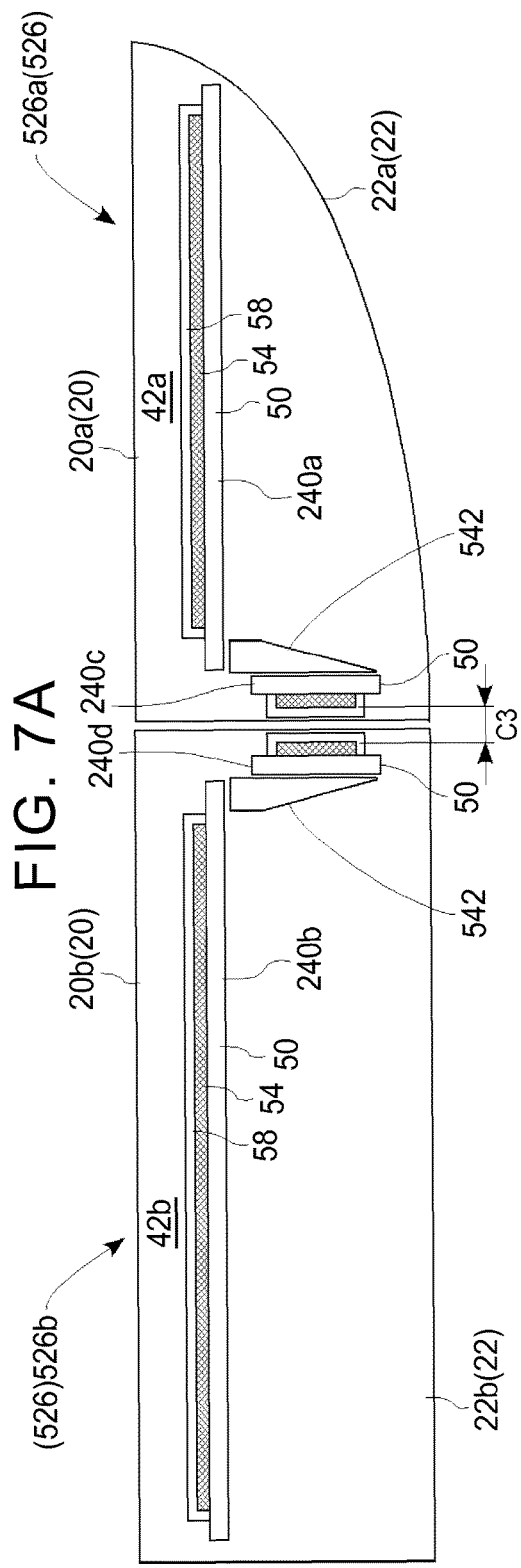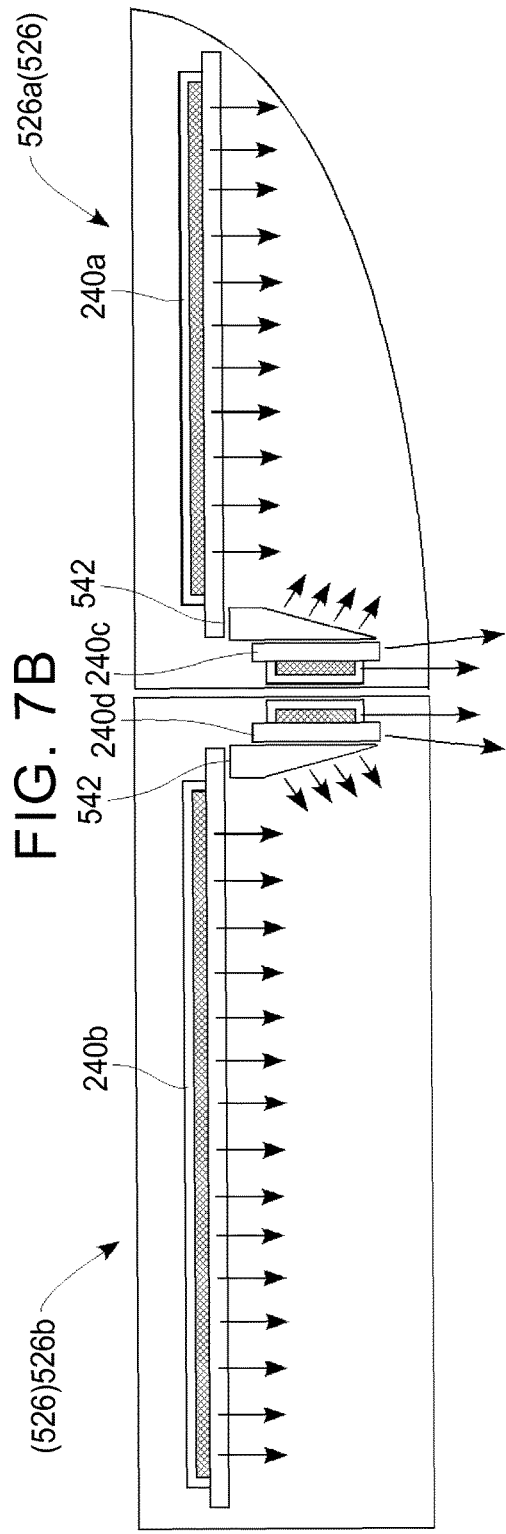

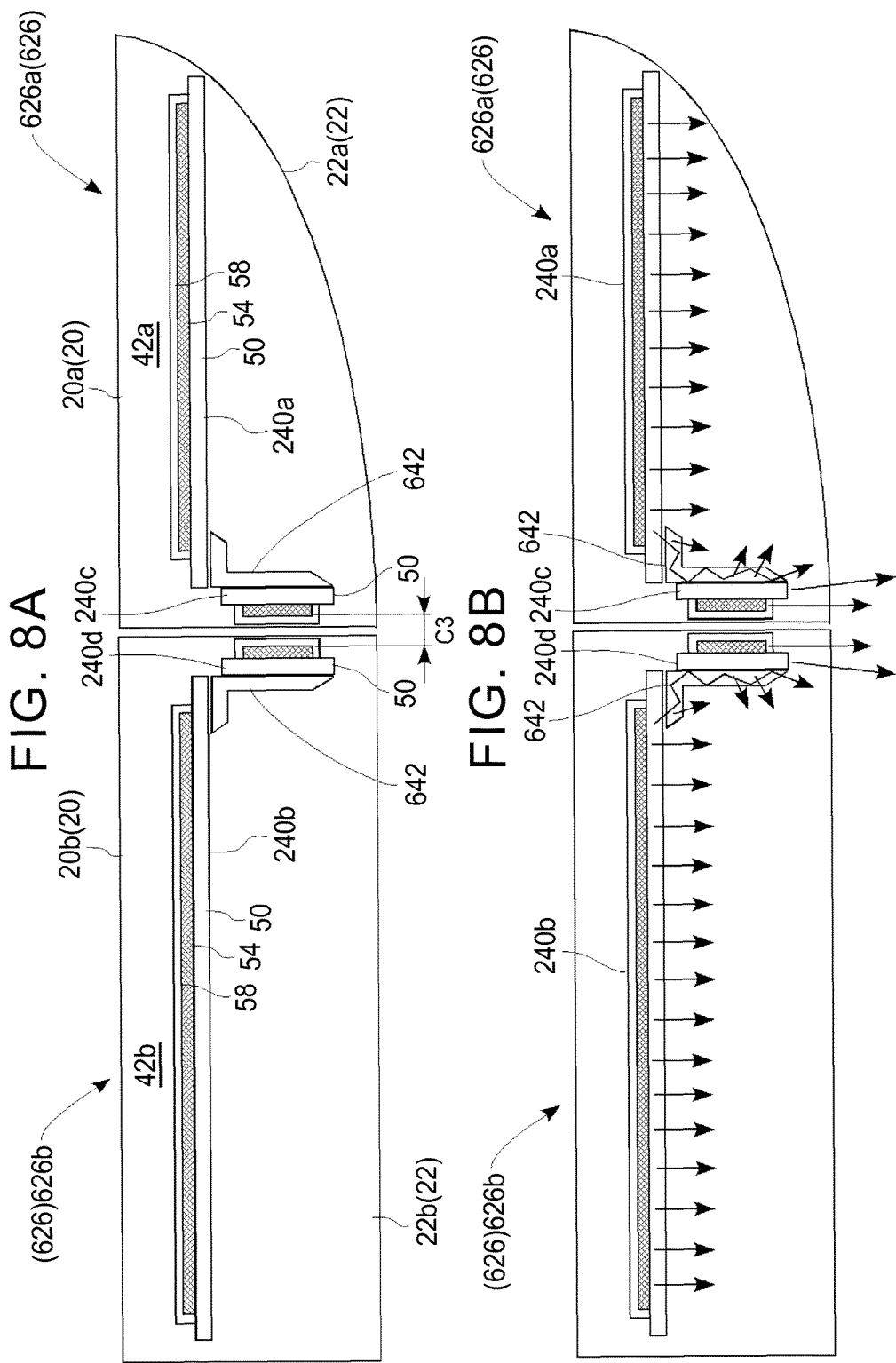

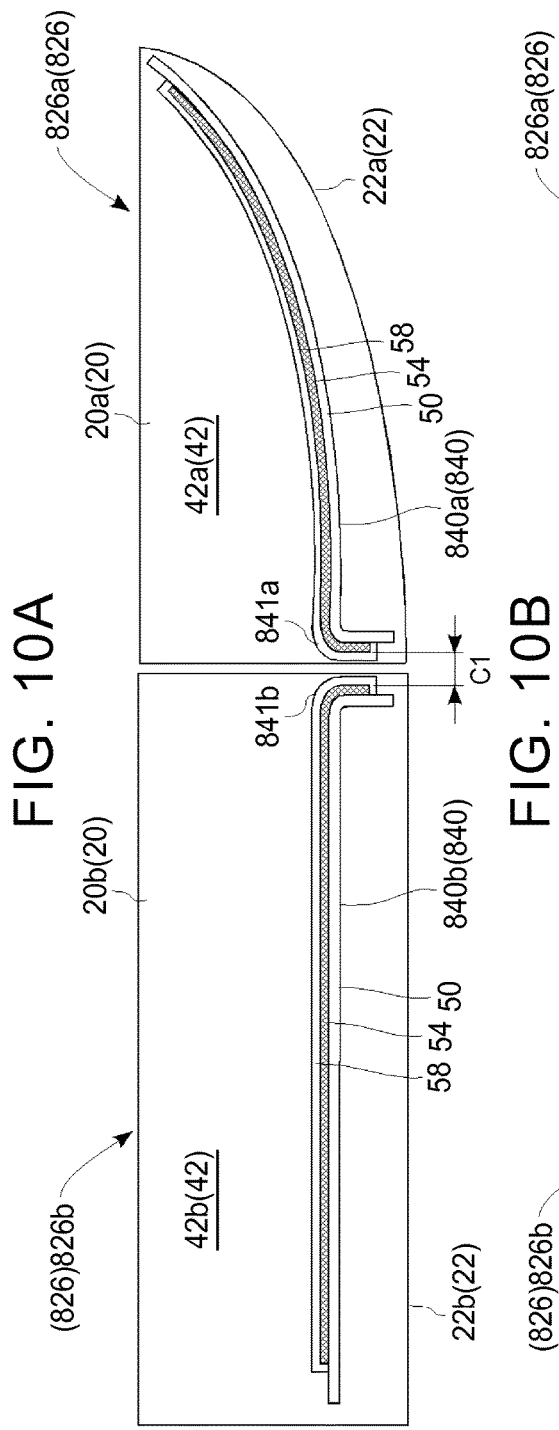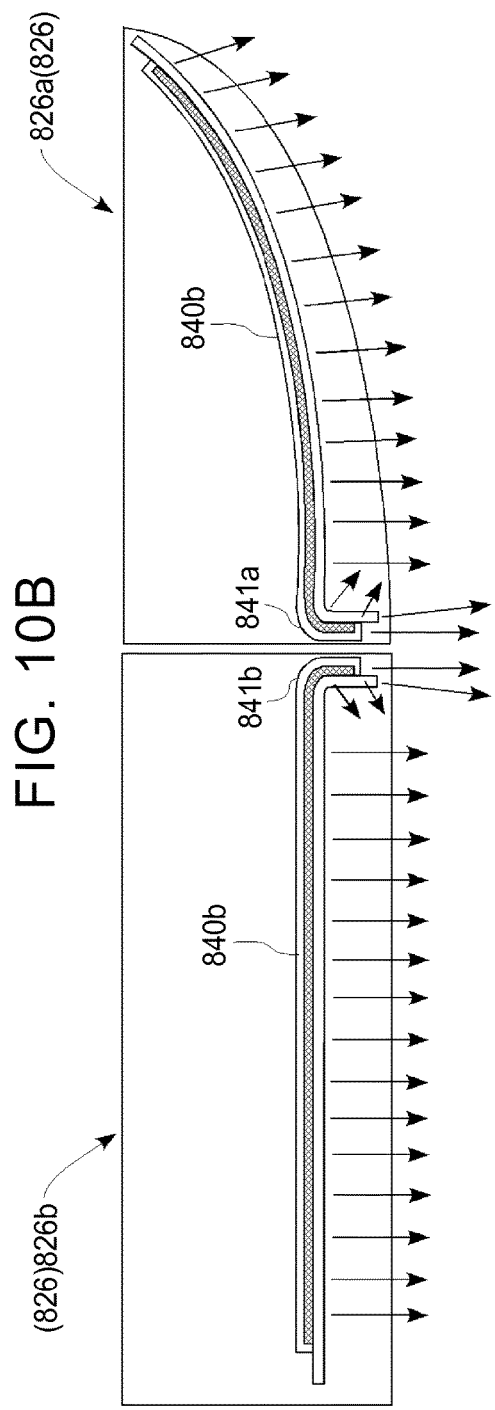

VEHICULAR LAMP

INCORPORATION BY REFERENCE

The disclosure of Japanese Patent Application No. 2014-175590 filed on Aug. 29, 2014 including the specification, drawings and abstract is incorporated herein by reference in its entirety.

BACKGROUND OF THE INVENTION

1. Field of the Invention

The invention relates to a vehicular lamp, and particularly relates to a vehicular lamp having a planar light source in which an organic EL light emitting layer is formed on a substrate.

2. Description of Related Art

With the recent prevalence of an organic EL panel, the use of the organic EL panel as a light source of a vehicular lamp is proposed (see Japanese Patent Application Publication No. 2013-45523 (JP 2013-45523 A)). In general, the organic EL panel is configured by forming an organic EL light emitting layer on one side surface of a transparent substrate and sealing the organic EL light emitting layer with a sealing plate. A positive electrode layer is formed on the front side (substrate side) of the organic EL light emitting layer, and a negative electrode layer is formed on the back side (sealing plate side) thereof. Hereinafter, the positive electrode layer and the negative electrode layer are collectively referred to as "electrode layers" appropriately. An area of an end portion of each of the electrode layers extends to the outside of the organic EL light emitting layer in the substrate for connection with an external power supply terminal. In addition, a joint portion between the sealing plate and the substrate is formed so as to surround the organic EL light emitting layer. Accordingly, in a peripheral edge portion of the organic EL panel, a non-light emitting portion that surrounds the organic EL light emitting layer is formed.

The organic EL panel described above emits light flatly, and hence the organic EL panel can be used as, e.g., part of a rear combination lamp or a side marker lamp. In this case, the organic EL panel is installed at a predetermined position in a lamp chamber, and the substrate is fixed to a lamp body such that a light emitting surface of a planar light source opposes an outer cover.

As described above, the organic EL panel has the non-light emitting portion in the peripheral edge portion, and the non-light emitting portion cannot be used as the light source. Accordingly, for example, in the case where a light-emitting portion is arranged with taking a design quality as a vehicular lamp into account, the installation mode of the organic EL panel in the lamp chamber is limited.

SUMMARY OF THE INVENTION

The invention provides the vehicular lamp in which a design quality of light emission of the planar light source is improved by a simple method in the case where the planar light source with the organic EL light emitting layer is used in the vehicular lamp.

A first aspect of the invention relates to a vehicular lamp including: a lamp body; a translucent outer cover that defines a lamp chamber between the outer cover and the lamp body; and a planar light source disposed in the lamp chamber and having a light emitting surface opposing the outer cover. The planar light source includes a flexible substrate and an organic EL light emitting layer formed on one side surface of the flexible substrate, and The planar light source has a bent portion in which the flexible substrate is bent at a predetermined position in a portion formed with the organic EL light emitting layer such that one end portion of the flexible substrate is directed to one of a side of the outer cover and a side opposite to the outer cover.

According to the aspect, by bending the flexible substrate at the position in the portion formed with the organic EL light emitting layer, it is possible to make a non-light emitting portion at the tip portion of the bent portion invisible or at least make the non-light emitting portion appear to be small when viewed from the outer cover side (the front side). Accordingly, the planar light source including the bent portion (an end portion after the bending viewed from the front side) appears to emit light when viewed from the outer cover side (front side), and design qualities are improved. That is, by a simple method in which the flexible substrate is bent at the portion formed with the organic EL light emitting layer, it is possible to improve design qualities of light emission of the planar light source. In the case where the flexible substrate is bent to the side opposite to the outer cover (back side), the non-light emitting portion at the tip portion of the portion bent to the back side is positioned outside the front view, and it is possible to make the non-light emitting portion invisible also when the vehicular lamp is viewed obliquely from the side.

The planar light source my include a first planar light source and a second planar light source, and the first planar light source and the second planar light source may be provided such that the bent portion of the first planer light source and the bent portion of the second planer light source are positioned adjacent to each other. According to the configuration, by positioning the bent portions of the two planar light sources adjacent to each other, it is possible to bring light emitting portions of the planar light sources close to each other. Accordingly, the configuration is suitable for a design method for making the two planar light sources appear to be integrated together or seamless.

A second aspect of the invention relates to a vehicular lamp including: a lamp body; a translucent outer cover that defines a lamp chamber between the outer cover and the lamp body; and a planar light source disposed in the lamp chamber. The planar light source includes a substrate and an organic EL light emitting layer formed on one side surface of the substrate, and the planar light source is provided such that at least part of an outer peripheral end of the organic EL light emitting layer emits light. The planar light source may be provided such that the at least part of the outer peripheral end of the organic EL light emitting layer is directed to a side of the outer cover.

According to the aspect, since the outer peripheral end of the organic EL light emitting layer functions as the light source, it is possible to use a light emission state of the outer peripheral end in the design. This becomes effective especially in the case where a design configuration in which light is emitted in a small space is adopted. In addition, it is possible to improve design qualities by the light emission of the planar light source by a simple method in which the outer peripheral end of the organic EL light emitting layer is directed to the front.

The vehicular lamp may further include a main light source having a light emitting surface that extends in a second direction orthogonal to a first direction in which the planar light source extends. In this case, the planar light source may be provided at a position corresponding to one end portion of the main light source.

The main light source may include a first main light source and a second main light source positioned adjacent to each other, the planar light source may include a third planar light source and a fourth planar light source positioned adjacent to each other, and the third planar light source may be provided at a position corresponding to one end portion of the first main light source and the fourth planar light source is provided at a position corresponding to one end portion of the second main light source.

One side surface of the organic EL light emitting layer may function as a main light emitting surface, and the at least part of the outer peripheral end of the organic EL light emitting layer may function as a sub-light emitting surface. According to the configuration, it becomes possible to make the maximum use of the light emitting portion of the planar light source, and hence it is possible to increase luminous efficiency.

The vehicular lamp may further include an optical member that directs light emitted from the main light emitting surface and light emitted from the sub-light emitting surface to the same direction. According to the configuration, it is possible to create a special design obtained by causing the main light emitting surface and the sub-light emitting surface to emit light at the same time in the same direction, and increase luminous efficiency of the planar light source toward the front.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

Figure 1:
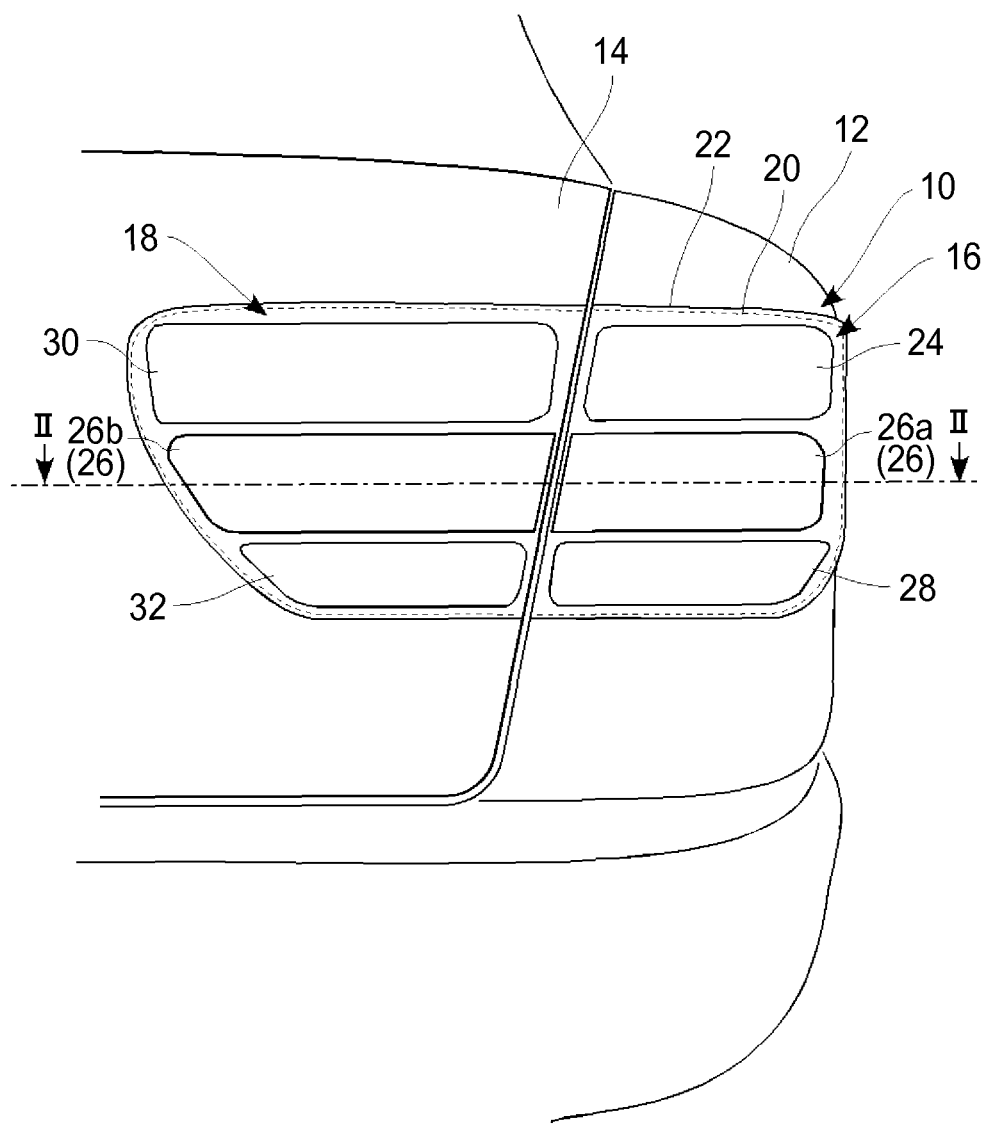
FIG. 1 is a view partially showing a right rear portion of a vehicle on which a vehicular lamp according to a first embodiment is mounted.
Figure 3A:
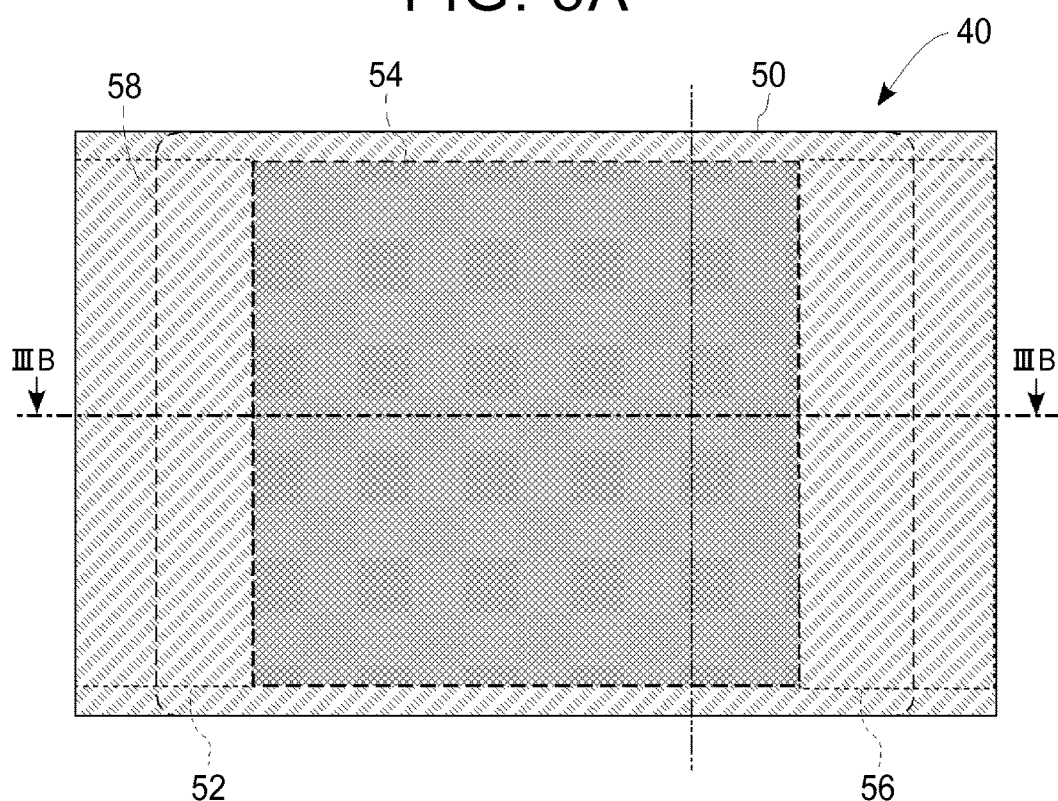
Figure 3B:
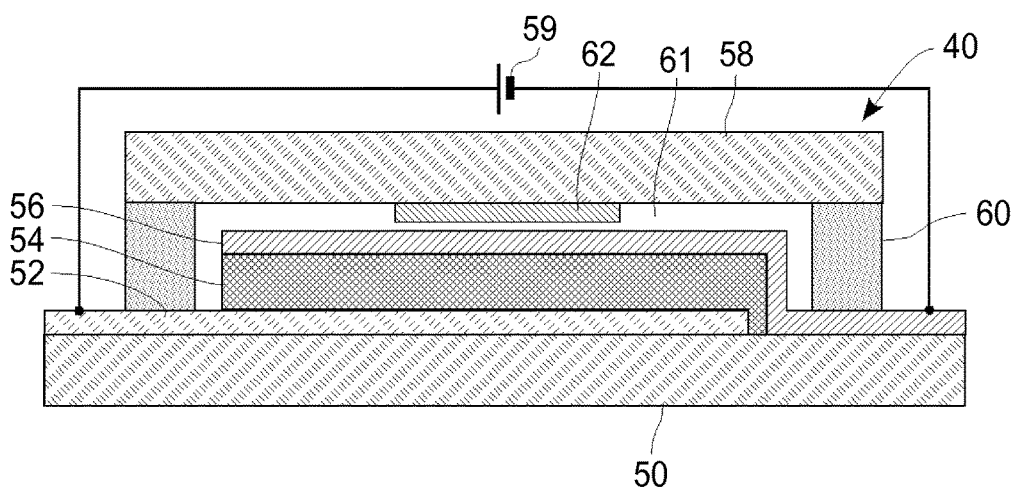
Figure 9A:
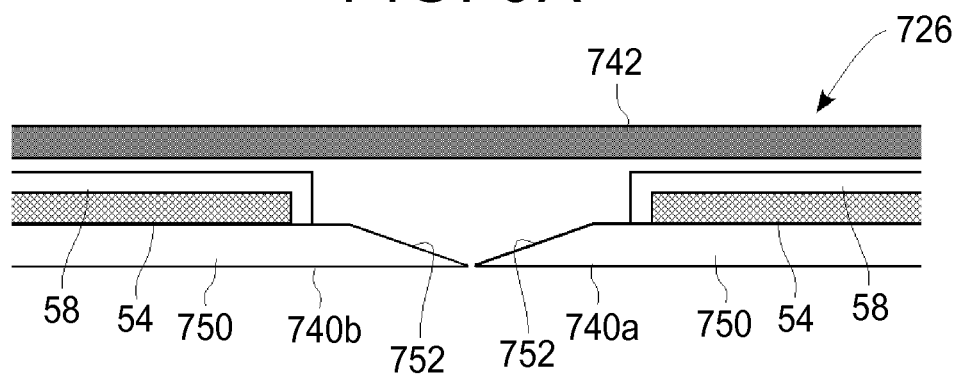
Figure 9B:
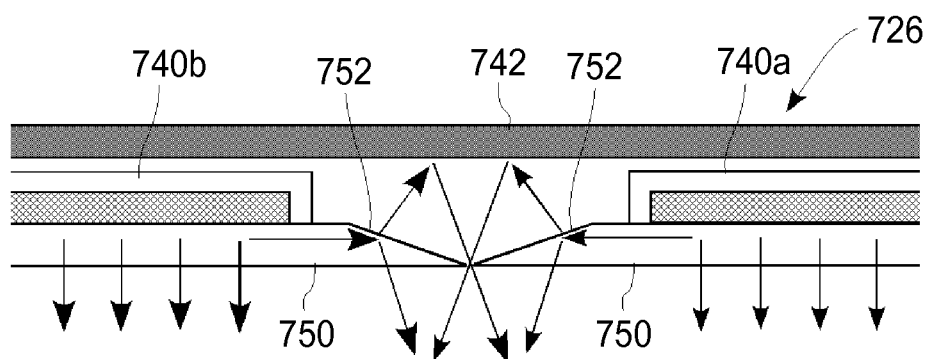

each of FIGS. 2A and 2B is a sectional view along arrows II-II of FIG. 1;

each of FIGS. 3A and 3B is a view schematically showing the configuration of an organic EL panel used as a light source of a tail lamp;

each of FIGS. 4A and 4B is a view showing the configuration of a principal portion of the vehicular lamp according to a second embodiment;

each of FIGS. 5A and 5B is a view showing the configuration of the principal portion of the vehicular lamp according to a third embodiment;

each of FIGS. 6A and 6B is a view showing the configuration of the principal portion of the vehicular lamp according to a fourth embodiment;

each of FIGS. 7A and 7B is a view showing the configuration of the principal portion of the vehicular lamp according to a fifth embodiment;

each of FIGS. 8A and 8B is a view showing the configuration of the principal portion of the vehicular lamp according to a sixth embodiment;

each of FIGS. 9A and 9B is a view showing the configuration of the principal portion of the vehicular lamp according to a seventh embodiment; and each of FIGS. 10A and 10B is a view showing the configuration of the principal portion of the vehicular lamp according to an eighth embodiment.

DETAILED DESCRIPTION OF EMBODIMENTS

Hereinbelow, embodiments of the invention will be described in detail with reference to the drawings. The same or equivalent constituent elements shown in the drawings are designated by the same reference numerals, and duplicate description thereof will be omitted appropriately. Note that a vehicular lamp described below is described by taking a rear combination lamp including a tail/stop lamp and a turn lamp as an example, but the vehicular lamp may also be a lamp such as a side marker lamp, a head lamp, or the like.

First Embodiment

FIG. 1 is a view partially showing a right rear portion of a vehicle on which a vehicular lamp according to a first embodiment is mounted. Note that the vehicular lamp is also provided on a left rear portion of the vehicle, but description thereof will be omitted. A vehicular lamp 10 is a rear combination lamp provided so as to extend over a body 12 and a trunk 14 of the vehicle, and is configured by a combination of a first lamp 16 mounted to the body 12 and a second lamp 18 mounted to the trunk 14. As shown in the drawing, the first lamp 16 and the second lamp 18 constitute one vehicular lamp 10 in a state in which the trunk 14 is closed, and the first lamp 16 and the second lamp 18 are separated from each other when the trunk 14 is opened.

The vehicular lamp 10 accommodates a plurality of lamps in a lamp chamber defined between a lamp body 20 and an outer cover 22. That is, in the first lamp 16, a turn lamp 24, a tail lamp 26a, and a clearance lamp 28 are provided to be arranged from above in this order. On the other hand, in the second lamp 18, a stop lamp 30, a tail lamp 26b, and a backup lamp 32 are provided to be arranged from above in this order. The tail lamps 26a and 26b constitute one oblong tail lamp 26 so as to extend over the body 12 and the trunk 14.

The tail lamp 26 uses an organic EL panel as a light source. By devising an installation method of the organic EL panel, as shown in the drawing, it is possible to bring the tail lamps 26a and 26b close to each other to make them appear to be one oblong tail lamp 26. Hereinbelow, the specific configuration will be described. Note that each of the turn lamp 24, the clearance lamp 28, the stop lamp 30, and the backup lamp 32 is a lamp having an LED or the like as the light source, and its configuration is a typical configuration so that description thereof will be omitted.

Each of FIGS. 2A and 2B is a sectional view along arrows II-II of FIG. 1. FIG. 2A shows the tail lamp 26 according to the embodiment, and FIG. 2B shows a tail lamp 126 according to a comparative example. Each of FIGS. 3A and 3B is a view schematically showing the configuration of the organic EL panel used as the light source of the tail lamp 26. FIG. 3A is a front view of the organic EL panel, and FIG. 3B is a sectional view along arrows 3B-3B of FIG. 3A.

As shown in FIG. 2A, the tail lamp 26 of the embodiment is configured by installing the organic EL panel in the lamp chamber of each of the first lamp 16 and the second lamp 18. That is, a first organic EL panel 40a is installed in a lamp chamber 42a defined between a lamp body 20a and an outer cover 22a of the first lamp 16, and a second organic EL panel 40b is installed in a lamp chamber 42b defined between a lamp body 20b and an outer cover 22b of the second lamp 18. The first organic EL panel 40a functions as a "first planar light source", and the second organic EL panel 40b functions as a "second planar light source". Note that, in the following description, based on the installation state of the organic EL panel, an outer cover side (a rear side of the vehicle) is referred to as a "front side", and a side opposite to the outer cover (a front side of the vehicle) is referred to as a "back side" for the convenience of the description.

Each of the outer covers 22a and 22b is formed of a translucent resin material. The outer cover 22a has a slant shape that is bent from the inside in a vehicle transverse direction to the outside therein so as to conform to a streamlined shape of a vehicle body. The first organic EL panel 40a is mounted to the lamp body 20a in a state in which one end portion of an organic EL panel 40 described later is bent to the back side. Similarly, the second organic EL panel 40b is also mounted to the lamp body 20b in a state in which one end portion of the organic EL panel 40 described later is bent to the back side. With this, a bent portion 41a of the first organic EL panel 40a, in which one end portion of the first organic EL panel 40a is bent to the back side, and a bent portion 41b of the second organic EL panel 40b, in which one end portion of the second organic EL panel 40b is bent to the back side, are positioned adjacent to each other viewed from the front side.

Herein, the basic configuration of the organic EL panel 40 used in the embodiment will be described. As shown in FIG. 3A, the organic EL panel 40 is the planar light source configured as what is called a flexible organic EL panel, and an organic EL light emitting layer 54 is formed at the middle of one side surface of a rectangular flexible substrate 50. Also as shown in FIG. 3B, the organic EL panel 40 is configured by stacking a positive electrode 52, the organic EL light emitting layer 54, and a negative electrode 56 on the substrate 50 and providing a sealing plate 58 such that the organic EL light emitting layer 54 is sealed from the outside.

The substrate 50 is a flexible substrate formed of a transparent thin film glass. The organic EL light emitting layer 54 is configured by stacking a hole injection layer, a hole transport layer, an organic light emitting layer, and an electron transport layer from the side of the positive electrode 52. The organic EL light emitting layer 54 is formed into a rectangular shape in the front view so as to conform to the substrate 50. A transparent electrode made of indium tin oxide (ITO) is used as the positive electrode 52, and a metal electrode made of aluminum or aluminum alloy is used as the negative electrode 56. Note that, in a modification, the transparent electrode made of ITO may be used as the negative electrode 56.

The positive electrode 52 is a thin film electrode layer and is disposed between the substrate 50 and the organic EL light emitting layer 54, and one end portion thereof extends to a first end of the organic EL panel 40. On the other hand, the negative electrode 56 is a thin film electrode layer and is disposed between the organic EL light emitting layer 54 and the sealing plate 58, and one end portion thereof extends to a second end of the organic EL panel 40. The positive electrode 52, the organic EL light emitting layer 54, and the negative electrode 56 are stacked on each other successively by, e.g., deposition. Terminals of an external power supply 59 are connected to the positive electrode 52 and the negative electrode 56.

The sealing plate 58 is a flexible substrate made of a thin film glass, and its peripheral edge portion is fixed to the substrate 50 via an adhesive 60. In the embodiment, an adhesive having translucency is used as the adhesive 60. With the configuration described above, the sealing plate 58 and the adhesive 60 function as a "sealing material" that seals the organic EL light emitting layer 54 from the outside. A space 61 inside the sealing member is filled with an inert gas. In addition, a drying agent 62 is attached to the inner surface of the sealing plate 58.

With the configuration described above, when a voltage is applied to the organic EL panel 40, holes are injected from the positive electrode 52, electrons are injected from the negative electrode 56, a fluorescent organic compound is excited with an energy generated when the holes are combined with the electrons in an organic layer, and the organic EL light emitting layer 54 emits light. The light emitted at this point is emitted toward the front through the transparent positive electrode 52 and the transparent substrate 50. That is, the surface of the organic EL panel 40 on the side of the substrate 50 serves as a main light emitting surface. Note that directional characteristics of light emission of the organic EL light emitting layer 54 conform to the Lambertian pattern, and directivity toward the front is large.

In the embodiment, the organic EL panel 40 is bent to the back side at a predetermined position (e.g., a position indicated by a two-dot chain line in the drawing) in a portion formed with the organic EL light emitting layer 54, and is installed in the lamp chamber. Accordingly, the above-described flexible substrate is used in the organic EL panel 40 such that the organic EL panel 40 is not damaged or characteristics thereof are not changed by the bending. Each of FIGS. 3A and 3B shows the basic configuration of the organic EL panel 40 used in the embodiment and, in the case where the organic EL panel 40 is specifically implemented as each of the first organic EL panel 40a and the second organic EL panel 40b, dimensions and shapes are adjusted according to the installation mode thereof.

Note that the flexible substrate is formed of the thin film glass in the embodiment, but there are cases where it is difficult to implement the substrate with the glass substrate depending on the curvature of each of the bent portions 41a and 41b. Therefore, instead of the thin film glass, a thin resin film may also be used. Note that, as described in, e.g., Japanese Patent Application Publication No. 2013-229202 (JP 2013-229202 A), the technique in which the flexible organic EL panel is constituted by the flexible substrate is available, and hence detailed description thereof will be omitted.

Returning to FIG. 2A, the first organic EL panel 40a is fixed in the lamp chamber 42a such that the most part of the light emitting surface (the surface of the organic EL light emitting layer 54 on the side of the substrate 50) is disposed along the outer cover 22a so as to oppose the outer cover 22a and one end portion thereof (an end portion on the left side in the drawing) is bent to the back side. At this point, the substrate 50 of the first organic EL panel 40a is bent at the position in the portion formed with the organic EL light emitting layer 54, and one end of the substrate 50 is directed to the back side, i.e., the side opposite to the outer cover 22a.

On the other hand, the second organic EL panel 40b is fixed in the lamp chamber 42b such that the most part of the light emitting surface (the surface of the organic EL light emitting layer 54 on the side of the substrate 50) is disposed along the outer cover 22b so as to oppose the outer cover 22b, and one end portion thereof (an end portion on the right side in the drawing) is bent to the back side. At this point, the substrate 50 of the second organic EL panel 40b is bent at the position in the portion formed with the organic EL light emitting layer 54, and one end of the substrate 50 is directed to the back side, i.e., the side opposite to the outer cover 22b.

With the configuration described above, the bent portion 41a of the first organic EL panel 40a and the bent portion 41b of the second organic EL panel 40b are positioned adjacent to each other, and it is thereby possible to bring the light emitting portions of the organic EL panels close to each other. Note that, in the drawing, for the convenience of the description, the thickness of the substrate of each organic EL panel is large, but the actual thickness of each substrate is less than 1 mm, and hence it is possible to bring the bent portions 41a and 41b close to each other considerably. That is, it becomes possible to set a clearance C1 between the light emitting portions of both of the organic EL panels to an extremely small clearance. With this, it is possible to eliminate a dark portion between the organic EL panels and make them appear to be integrated together, and design qualities of light emission are improved. That is, in a state shown in FIG. 1 in which the trunk 14 is closed, it becomes possible to make the tail lamp 26a installed in the body 12 and the tail lamp 26b installed in the trunk 14 appear to be seamless.

In contrast to this, in a comparative example shown in FIG. 2B, the entire first organic EL panel 140a is installed along the outer cover 22a, and the entire second organic EL panel 140b is installed along the outer cover 22b. Accordingly, non-light emitting portions 141a and 141b of the first organic EL panel 140a and the second organic EL panel 140b in the vicinity of ends of the substrates 50 are positioned adjacent to each other. In this configuration, a large non-light emitting portion of the non-light emitting portions 141a and 141b is formed in a boundary portion between the outer covers 22a and 22b. That is, a clearance C2 between the light emitting portions of both of the organic EL panels is large, and a large dark portion (discontinuous portion) is formed when the entire portion is viewed as the light emitting surface of a tail lamp 126. Accordingly, it becomes difficult to make a tail lamp 126a installed in the body 12 and a tail lamp 126b installed in the trunk 14 appear to be seamless. Note that, in the drawing, the clearances C1 and C2 are depicted for the convenience of the description. The actual length of the non-light emitting portion is considerably large as compared with the thickness of the organic EL panel, and hence the difference between the clearance C1 and the clearance C2 is apparent, and the difference is much larger than the difference shown in the drawing.

In other words, according to the embodiment, by a simple method in which each of the organic EL panels 40a and 40b is bent at a position in the portion formed with the organic EL light emitting layer 54, the organic EL panels 40a and 40b including the bent portions 41a and 41b (end portions after the bending) appear to emit light when viewed from the front side. By disposing the two organic EL panels 40a and 40b each having the above configuration such that the bent portions 41a and 41b thereof are positioned adjacent to each other, it is possible to make them appear to emit light as one planar light source, and improve design qualities of the tail lamp 26.

Second Embodiment

Each of FIGS. 4A and 4B is a view showing the configuration of a principal portion of the vehicular lamp according to a second embodiment. The drawings corresponds to FIG. 2A in the first embodiment. FIG. 4A shows the configuration of the principal portion, and FIG. 4B shows an operating state of the principal portion. Note that, in the following description, points different from the first embodiment will be mainly described, and constituent elements common to the first embodiment are designated by the same reference numerals and description thereof will be omitted.

As shown in FIG. 4A, a tail lamp 226 of the embodiment has a character in which the light emitting portions of adjacent tail lamps 226a and 226b are made to appear to be seamless by effectively using light emitted by an outer peripheral end in the organic EL panel and what is called substrate-mode light. Herein, the "substrate-mode light" means light that is emitted from the end portion of the substrate 50 without being emitted toward the front of the substrate 50 by being subjected to total reflection in the substrate 50.

The tail lamp 226a has a first organic EL panel 240a that extends in the vehicle transverse direction in the lamp chamber 42a, and a third organic EL panel 240c that extends in a vehicle longitudinal direction. Each of the organic EL panels 240a and 240c does not have the bent portion of the first embodiment. The first organic EL panel 240a is provided slightly in the back (the upper side in the drawing) of the lamp body 20a such that its main light emitting surface is directed to the front. On the other hand, the third organic EL panel 240c is provided so as to extend along an inner end (a left end in the drawing) of the lamp body 20a at a position corresponding to one end portion of the first organic EL panel 240a. As shown in the drawing, an angle formed between the first organic EL panel 240a and the third organic EL panel 240c is set to 90 degrees. The first organic EL panel 240a functions as a "first main light source", and the third organic EL panel 240c functions as a "third planar light source". Herein, the vehicle longitudinal direction is an example of a "first direction in which the planar light source extends", and the vehicle transverse direction is an example of a "second direction orthogonal to the first direction in which the light emitting surface of the main light source extends". A reflector 242 is disposed between the organic EL panels 240a and 240c. The reflector 242 functions as an "optical member".

On the other hand, the tail lamp 226b has the configuration similar to that of the tail lamp 226a. That is, the tail lamp 226b has a second organic EL panel 240b that extends in the vehicle transverse direction in the lamp chamber 42b, and a fourth organic EL panel 240d that extends in the vehicle longitudinal direction. The second organic EL panel 240b is provided slightly in the back of the lamp body 20b such that its main light emitting surface is directed to the front. On the other hand, the fourth organic EL panel 240d is provided so as to extend along an outer end (a right end in the drawing) of the lamp body 20b at a position corresponding to one end portion of the second organic EL panel 240b. As shown in the drawing, an angle formed between the second organic EL panel 240b and the fourth organic EL panel 240d is set to 90 degrees. The second organic EL panel 240b functions as a "second main light source", and the fourth organic EL panel 240d functions as a "fourth planar light source". In addition, the reflector 242 is disposed between the organic EL panels 240b and 240d. The second organic EL panel 240b is positioned substantially on the same plane as the plane on which the first organic EL panel 240a is positioned. Further, the second organic EL panel 240b is adjacent to the first organic EL panel 240a in the vehicle transverse direction, and the fourth organic EL panel 240d is adjacent to the third organic EL panel 240c in the vehicle transverse direction.

With the configuration described above, when the tail lamp 226 is operated, light emission indicated by arrows in FIG. 4B is performed. That is, light is emitted toward the front from the main light emitting surface of each of the first organic EL panel 240a and the second organic EL panel 240b. On the other hand, the main light emitting surface of the third organic EL panel 240c is directed to the outer side in the vehicle transverse direction (a right direction in the drawing), and part of light emitted from the main light emitting surface is reflected toward the front by the reflector 242. In addition, light is emitted from an outer peripheral end on the front side of the organic EL light emitting layer 54 of the third organic EL panel 240c, and the substrate-mode light is emitted from an outer peripheral end on the front side of the substrate 50. That is, light emitted from the surface (hereinafter also referred to as a "sub-light emitting surface") that is not the main light emitting surface of the third organic EL panel 240c is directed to the front.

The main light emitting surface of the fourth organic EL panel 240d is directed to the inner side in the vehicle transverse direction (a left direction in the drawing), and part of light emitted from the main light emitting surface is reflected toward the front by the reflector 242. In addition, light is emitted from an outer peripheral end on the front side of the organic EL light emitting layer 54 of the fourth organic EL panel 240d, and the substrate-mode light is emitted from an outer peripheral end on the front side of the substrate 50. That is, light emitted from the sub-light emitting surface of the fourth organic EL panel 240d is directed to the front.

Thus, in the embodiment, it is possible to cause the organic EL panels 240c and 240d provided at the boundary between the tail lamps 226a and 226b to emit light to the front side in the vicinity of the boundary between the organic EL panels 240c and 240d, and hence it is possible to bring the light emitting portions of the tail lamps 226a and 226b close to each other collectively. That is, it becomes possible to set a clearance C3 between the light emitting portions of the tail lamps 226a and 226b to an extremely small clearance. With this, in the state shown in FIG. 1 in which the trunk 14 is closed, it becomes possible to make the tail lamp 226a installed in the body 12 and the tail lamp 226b installed in the trunk 14 appear to be seamless, and design qualities of the light emission are improved.

Third Embodiment

Each of FIGS. 5A and 5B is a view showing the configuration of the principal portion of the vehicular lamp according to a third embodiment. FIG. 5A shows the configuration of the principal portion, and FIG. 5B shows the operating state of the principal portion. Note that, in the following description, points different from the second embodiment will be mainly described, and constituent elements common to the second embodiment are designated by the same reference numerals and description thereof will be omitted.

As shown in FIG. 5A, in a tail lamp 326 in the embodiment, instead of the reflector 242 in the second embodiment, a reflective film is deposited on each organic EL panel. That is, a reflective film 342 is provided at an end portion in the vicinity of the third organic EL panel 240c in the first organic EL panel 240a. On the other hand, reflective films 344 are provided at both end portions of the third organic EL panel 240c. Each reflective film is formed by depositing a metal film on an upper surface of the substrate 50. Similarly, the reflective film 342 is provided at an end portion in the vicinity of the fourth organic EL panel 240d in the second organic EL panel 240b. On the other hand, the reflective films 344 are provided at both end portions of the fourth organic EL panel 240d. Each reflective film is formed by depositing the metal film on the upper surface of the substrate 50.

With the configuration described above, when the tail lamp 326 is operated, light emission indicated by arrows in FIG. 5B is performed. That is, light is emitted toward the front from the main light emitting surface of each of the first organic EL panel 240a and the second organic EL panel 240b. Directional characteristics of the light emission conform to the Lambertian pattern, and hence part of light emitted from the first organic EL panel 240a is reflected toward the front by the reflective films 344 of the third organic EL panel 240c. In addition, part of light emitted from the second organic EL panel 240b is reflected toward the front by the reflective films 344 of the fourth organic EL panel 240d.

On the other hand, part of light emitted from the main light emitting surface of the third organic EL panel 240c is reflected toward the front by the reflective film 342 of the first organic EL panel 240a. In addition, light is emitted toward the front from the outer peripheral end on the front side (the sub-light emitting surface) of the third organic EL panel 240c. Similarly, part of light emitted from the main light emitting surface of the fourth organic EL panel 240d is reflected toward the front by the reflective film 342 of the second organic EL panel 240b. Further, light is emitted toward the front from the outer peripheral end on the front side (the sub-light emitting surface) of the fourth organic EL panel 240d.

Thus, according to the embodiment as well, it is possible to cause the organic EL panels 240c and 240d provided at the boundary between the tail lamps 326a and 326b to emit light to the front side in the vicinity of the boundary between the organic EL panels 240c and 240d, and hence it is possible to bring the light emitting portions of the tail lamps 326a and 326b close to each other.

Fourth Embodiment

Each of FIGS. 6A and 6B is a view showing the configuration of the principal portion of the vehicular lamp according to a fourth embodiment. FIG. 6A shows the configuration of the principal portion, and FIG. 6B shows the operating state of the principal portion. Note that, in the following description, points different from the second embodiment will be mainly described, and constituent elements common to the second embodiment are designated by the same reference numerals and description thereof will be omitted.

As shown in FIG. 6A, in a tail lamp 426 of the embodiment, a reflector 442 that is different in shape from the reflector 242 of the second embodiment is provided as the "optical member". The reflector 442 has an L-shaped cross section, and has two reflective surfaces that are orthogonal to each other. That is, the reflector 442 is disposed at each of a boundary portion between the first organic EL panel 240a and the third organic EL panel 240c and a boundary portion between the second organic EL panel 240b and the fourth organic EL panel 240d.

With the configuration described above, when the tail lamp 426 is operated, light emission indicated by arrows in FIG. 6B is performed. That is, light is emitted toward the front from the main light emitting surface of each of the first organic EL panel 240a and the second organic EL panel 240b. Part of light emitted from the first organic EL panel 240a is reflected toward the front by one of the reflective surfaces of the reflector 442. Part of light emitted from the second organic EL panel 240b is also reflected toward the front by one of the reflective surfaces of the reflector 442.

On the other hand, part of light emitted from the main light emitting surface of the third organic EL panel 240c is reflected toward the front by the other reflective surface of the reflector 442. In addition, light is emitted toward the front from the outer peripheral end on the front side (the sub-light emitting surface) of the third organic EL panel 240c. Similarly, part of light emitted from the main light emitting surface of the fourth organic EL panel 240d is reflected toward the front by the other reflective surface of the reflector 442. In addition, light is emitted toward the front from the outer peripheral end on the front side (the sub-light emitting surface) of the fourth organic EL panel 240d.

Thus, according to the embodiment as well, it is possible to cause the organic EL panels 240c and 240d provided at the boundary between the tail lamps 426a and 426b to emit light to the front side in the vicinity of the boundary between the organic EL panels 240c and 240d, and hence it is possible to bring the light emitting portions of the tail lamps close to each other collectively.

Fifth Embodiment

Each of FIGS. 7A and 7B is a view showing the configuration of the principal portion of the vehicular lamp according to a fifth embodiment. FIG. 7A shows the configuration of the principal portion, and FIG. 7B shows the operating state of the principal portion. Note that, in the following description, points different from the second embodiment will be mainly described, and constituent elements common to the second embodiment are designated by the same reference numerals and description thereof will be omitted.

As shown in FIG. 7A, in a tail lamp 526 of the embodiment, a transparent light guide body 542 is provided on an upper surface of each of the third organic EL panel 240c and the fourth organic EL panel 240d. The light guide body 542 functions as the "optical member". The light guide body 542 provided in the third organic EL panel 240c extends to a position in the vicinity of the first organic EL panel 240a. The light guide body 542 provided in the fourth organic EL panel 240d extends to a position in the vicinity of the second organic EL panel 240b. Each light guide body 542 is formed into a wedge-like shape of which the cross section is tapered with approach to the front side, and contains a diffusing agent that effectively scatters light propagating in the internal portion of the light guide body 542.

With the configuration described above, when the tail lamp 526 is operated, light emission indicated by arrows in FIG. 7B is performed. That is, light emitted from the main light emitting surface of the third organic EL panel 240c and light emitted from a portion in the vicinity of an end portion of the first organic EL panel 240a are diffused in the process of propagation in the light guide body 542, and are emitted from an emission surface defined by the shape of the light guide body 542. Similarly, light emitted from the main light emitting surface of the fourth organic EL panel 240d and light emitted from a portion in the vicinity of an end portion of the second organic EL panel 240b are diffused in the process of propagation in the light guide body 542, and are emitted from the emission surface defined by the shape of the light guide body 542. Each emitted light has a component toward the front.

Thus, by providing the light guide bodies 542 on the front side of the non-light emitting portion formed between the first organic EL panel 240a and the second organic EL panel 240b, it is possible to make the light emission by the tail lamps 526a and 526b appear to be seamless.

Sixth Embodiment

Each of FIGS. 8A and 8B is a view showing the configuration of the principal portion of the vehicular lamp according to a sixth embodiment. FIG. 8A shows the configuration of the principal portion, and FIG. 8B shows the operating state of the principal portion. Note that, in the following description, points different from the fifth embodiment will be mainly described, and constituent elements common to the fifth embodiment are designated by the same reference numerals and description thereof will be omitted.

As shown in FIG. 8A, in a tail lamp 626 of the embodiment, a light guide body 642 that is different from the light guide body 542 of the fifth embodiment is provided as the "optical member". The light guide body 642 is a transparent light guide body having an L-shaped cross section, and does not contain the diffusing agent.

With the configuration described above, when the tail lamp 626 is operated, light emission indicated by arrows in FIG. 8B is performed. That is, light emitted from the main light emitting surface of the third organic EL panel 240c and light emitted from a portion in the vicinity of the end portion of the first organic EL panel 240a are emitted in a direction determined by the shape of the light guide body 642. Similarly, light emitted from the main light emitting surface of the fourth organic EL panel 240d and light emitted from a portion in the vicinity of the end portion of the second organic EL panel 240b are emitted in a direction determined by the shape of the light guide body 642. Each emitted light has a component toward the front.

Thus, in the embodiment as well, by providing the light guide bodies 642 on the front side of the non-light emitting portion formed between the first organic EL panel 240a and the second organic EL panel 240b, it is possible to make the light emission by the tail lamps 626a and 626b appear to be seamless.

Seventh Embodiment

Each of FIGS. 9A and 9B is a view showing the configuration of the principal portion of the vehicular lamp according to a seventh embodiment. FIG. 9A shows the configuration of the principal portion, and FIG. 9B shows the operating state of the principal portion. The embodiment assumes the case where a plurality of the organic EL panels are provide in one lamp chamber.

As shown in FIG. 9A, a tail lamp 726 of the embodiment is configured by arranging a first organic EL panel 740a and a second organic EL panel 740b on the same plane. An opposing surface of a substrate 750 of each of the organic EL panels is formed as a tapered end surface 752. That is, an end portion of the substrate 750 is processed so as to have an acute angle. In addition, a flat reflector 742 is disposed on the back side of both of the organic EL panels.

With the configuration described above, when the tail lamp 726 is operated, light emission indicated by arrows in FIG. 9B is performed. That is, light is emitted toward the front from the main light emitting surface of each of the first organic EL panel 740a and the second organic EL panel 740b. Part of the emitted light becomes the substrate-mode light propagating in the substrate 750 due to total reflection, and is reflected or refracted at the end surface 752. The light reflected at the end surface 752 is emitted from the front of the substrate 750. On the other hand, the light refracted at the end surface 752 is reflected by the reflector 742 on the back side, and is emitted toward the front.

With the configuration described above, it becomes possible to eliminate or reduce the non-light emitting portion between the plurality of the organic EL panels 740a and 740b that are arranged in parallel. In addition, it is possible to guide the substrate-mode light to the front side, and hence it is possible to increase luminous efficiency of the organic EL panels 740a and 740b.

Eighth Embodiment

Each of FIGS. 10A and 10B is a view showing the configuration of the principal portion of the vehicular lamp according to an eighth embodiment. FIG. 10A shows the configuration of the principal portion, and FIG. 10B shows the operating state of the principal portion. Note that, in the following description, points different from the first embodiment will be mainly described, and constituent elements common to the first embodiment are designated by the same reference numerals and description thereof will be omitted.

As shown in FIG. 10A, in a tail lamp 826 of the embodiment, an end portion of the organic EL panel is bent to a side opposite to the side in the first embodiment. That is, in a bent portion 841a of a first organic EL panel 840a and a bent portion 841b of a second organic EL panel 840b, end portions of the organic EL panel 840a and 840b are bent to the front side. With this, in each organic EL panel, one end of the substrate 50 is directed to the front side, i.e., the side of the outer cover 22.

With the above configuration as well, it is also possible to bring the light emitting portions of the organic EL panels 840a and 840b close to each other by positioning the bent portion 841a of the first organic EL panel 840a and the bent portion 841b of the second organic EL panel 840b adjacent to each other. With this, it is possible to eliminate the dark portion between the organic EL panels 840a and 840b to make them appear to be integrated together, and design qualities of the light emission are improved.

With the configuration described above, when the tail lamp 826 is operated, light emission indicated by arrows in FIG. 10B is performed. That is, light emitted from the main light emitting surface of each of the organic EL panels 840a and 840b and light emitted from the end portion of each of the organic EL panels 840a and 840b are emitted toward the front. Light emitted from each of the bent portions 841a and 841b of the organic EL panels 840a and 840b also has a component toward the front. With this, it is possible to make the light emission by the tail lamp 826a and 826b appear to be seamless.

The invention have been described with reference to the embodiments thus far, but the invention is not limited to the above-described embodiments, and variations in which the configurations of the embodiments are appropriately combined or substituted are also encompassed by the invention. In addition, appropriate changes of the combinations or the orders of the processes in the embodiments can be made, and various modifications such as design modifications can be made with respect to the embodiments based on the knowledge of a person skilled in the art. Such modified embodiments can also fall in the scope of the invention.

Although not described in the seventh embodiment described above, the end surface 752 of the substrate 750 may be subjected to surface texturing. With this, it is possible to scatter the substrate-mode light using its texture, and cause a portion between the organic EL panels 740a and 740b to emit light in a manner different from that in the seventh embodiment.

The above embodiments have described an example of the configuration in which the same arrangement of the organic EL panels and other optical members (substantially symmetric with resect to the boundary line between the lamps) is applied to the plurality of the tail lamps arranged in parallel. In a modification, one of the tail lamps arranged in parallel may have the structure of the embodiment different from that of the other tail lamp.

The above embodiments have described an example in which the metal electrode is used as the negative electrode 56 of the organic EL panel, but a transparent electrode formed of ITO may also be used as the negative electrode 56 similarly to the positive electrode 52. With this, it becomes possible to cause portions on both sides of the outer peripheral end of the organic EL light emitting layer 54 to emit light.

The above embodiments have described the LED as the light source of the lamp other than the tail lamp as an example, but a laser diode, a discharge lamp bulb, an incandescent bulb, or a halogen bulb can also be used. Alternatively, similarly to the tail lamp, the organic EL panel may also be used.

The above embodiments have described an example in which the configuration of the principal portion described above is applied to the tail lamp, but the configuration thereof may also be applied to other lamps such as a stop lamp and a clearance lamp.

Although not described in the above embodiments, one of the light sources of the plurality of the lamps arranged in parallel may be constituted by the organic EL panel, and the other light source thereof may be constituted by other light sources such as the LED. In this case, light emission of the plurality of the lamps may be made to appear to be integrated together or seamless by mounting the light guide body to the other light source.

What is claimed is:

1. A vehicular lamp comprising:
   a lamp body;
   a translucent outer cover that defines a first lamp chamber and a second lamp chamber between the outer cover and the lamp body, the first and second lamp chambers defined by a wall provided between the first and second lamp chambers, the first and second lamp chambers being adjacent to each other;
   a planar light source disposed in the lamp chamber and having a light emitting surface opposing the outer cover, wherein:
   the planar light source includes a flexible substrate and an organic EL light emitting layer formed on one side surface of the flexible substrate, and
   the planar light source has a bent portion in which the flexible substrate is bent at a predetermined position in a portion formed with the organic EL light emitting layer such that one end portion of the flexible substrate is directed toward one of a direction away from a light-emitting surface of the outer cover and a direction approaching the light-emitting surface of the outer cover, and
   wherein:
   the planar light source includes:
      a first planar light source provided in the first lamp chamber and having a first bent portion; and
      a second planar light source provided in the second lamp chamber and having a second bent portion, and
   the first planar light source and the second planar light source are provided such that the first bent portion of the first planer light source and the second bent portion of the second planer light source are spaced apart from each other by the wall provided between the first and second lamp chambers and face each other.

2. A vehicular lamp comprising:
   a lamp body;
   a translucent outer cover that defines a lamp chamber between the outer cover and the lamp body;
   a planar light source disposed in the lamp chamber and having a first substrate and a first organic EL light emitting layer formed on one side surface of the first substrate; and
   a main light source having a second substrate and a second organic EL light emitting layer formed on a first side surface of the second substrate, the first substrate extending in a second direction orthogonal to a first direction in which the second substrate extends, wherein:

the first and the second substrates are spaced apart from each other, a second side surface opposite to the first side surface of the second substrate, on which the second organic EL light emitting layer is formed, faces the outer cover, and the planar light source is provided such that at least part of an outer peripheral end of the first organic EL light emitting layer emits light.

3. The vehicular lamp according to claim 2, wherein the planar light source is provided at a position corresponding to one end portion of the main light source.

4. The vehicular lamp according to claim 2, wherein:

one side surface of the first organic EL light emitting layer functions as a main light emitting surface; and the at least part of the outer peripheral end of the second organic EL light emitting layer functions as a sub-light emitting surface.

5. The vehicular lamp according to claim 2, wherein the planar light source is provided such that the at least part of the outer peripheral end of the first organic EL light emitting layer is directed to a side of the outer cover.

6. The vehicular lamp according to claim 2, wherein the first substrate extends in a vehicle longitudinal direction and the at least part of the outer peripheral end of the first organic EL light emitting layer emits light in the vehicle longitudinal direction.

7. The vehicular lamp according to claim 2, wherein the first substrate extends along a first plane and the second substrate extends along a second plane, which extends orthogonal to the first plane.

8. The vehicular lamp according to claim 3, wherein:

the main light source includes a first main light source and a second main light source positioned adjacent to each other;

the planar light source includes a third planar light source and a fourth planar light source positioned adjacent to each other; and the third planar light source is provided at a position corresponding to one end portion of the first main light source and the fourth planar light source is provided at a position corresponding to one end portion of the second main light source.

9. The vehicular lamp according to claim 4, further comprising an optical member that directs light emitted from the main light emitting surface and light emitted from the sub-light emitting surface to the same direction.

* * * * *